United States Patent [19]

Matheson

[11] Patent Number: 4,466,331
[45] Date of Patent: Aug. 21, 1984

[54] METHOD OF FORMING TWISTED MULTIPLE STRAND SYNTHETIC TWINE, TWINES PRODUCED THEREBY, AND FISHNETS FORMED THEREOF

[75] Inventor: Mackenzie W. Matheson, Vancouver, Canada

[73] Assignee: Redden Net Co., Inc., Bellingham, Wash.

[21] Appl. No.: 501,444

[22] Filed: Jun. 6, 1983

[51] Int. Cl.³ .................. A01K 73/00; D02G 3/04; D02G 3/44
[52] U.S. Cl. .............................. 87/12; 43/7; 43/10; 57/236; 57/243; 57/244; 57/248
[58] Field of Search ............... 43/7, 10, 14; 87/12, 87/53; 57/200, 236, 238, 243, 244, 248, 237

[56] References Cited
U.S. PATENT DOCUMENTS

| | | | |
|---|---|---|---|
| 2,999,413 | 9/1961 | Momoi | 87/12 |
| 3,329,061 | 7/1967 | Momoi | 87/12 |
| 3,369,317 | 2/1968 | Brownell | 43/7 |
| 3,507,109 | 4/1970 | Nakazawa | 57/236 |
| 3,793,822 | 2/1974 | Kawai | 57/244 X |

Primary Examiner—John Petrakes
Attorney, Agent, or Firm—Hughes, Barnard & Cassidy

[57] ABSTRACT

A composite multiple strand or filament twisted fishnet twine (11, 11') formed of synthetic material, methods for forming the same, and fishnets (10) formed therefrom, characterized in the use of a plurality of relatively fine, small diameter synthetic filaments ($15_a$-$15_n$) which may be on the order of 210 denier and which are twisted together in one of an "S" or a "Z" configuration to form a first multiple filament "B" strand (15) which is thereafter twisted with a plurality of relatively thick monofilament "A" strands ($14_a$-$14_n$) formed of synthetic material with either a "Z" or an "S" twist to form a coreless twine (11, 11') in which all of the "A" and "B" strands ($14_a$-$14_n$ and 15) are of equal length per unit length of the twine (11, 11') and the individual fibers ($14_a$-$14_n$) and ($15_a$-$15_n$) are all exposed on the outer surface of the twine along substantially the entire lengths of the individual fibers. In one exemplary form of the invention, twenty-six filaments ($15_a$-$15_n$) of approximately 210 denier are twisted in a clockwise direction to form an "S" twisted "B" strand (15) which is thereafter twisted with four monofilament "A" strands ($14_a$-$14_n$) in a "Z" or counterclockwise direction to form a composite twine (11); while in another exemplary form of the invention, the relatively fine multiple filaments ($15_a$-$15_n$) are twisted with a "Z" twist to form a multiple filament "B" strand (15) which is therafter twisted with the monofilaments ($14_a$-$14_n$) in an "S" configuration to form a composite twine (11'). Modified forms of twines (11, 11') are described employing a multiple filament twisted "B" strand (15) employing from sixteen to twenty-six or more fine filaments with the multiple filament "B" strand (15) thereafter being twisted together with a plurality of monofilament "A" strands ($14_a$-$14_n$) ranging in number from about four to about fourteen strands.

27 Claims, 4 Drawing Figures

METHOD OF FORMING TWISTED MULTIPLE STRAND SYNTHETIC TWINE, TWINES PRODUCED THEREBY, AND FISHNETS FORMED THEREOF

BACKGROUND OF THE INVENTION

1. Technical Field

The present invention relates generally to gillnets or similar fishnets formed of multiple synthetic strands; and, more particularly, to improved multiple strand twisted fishnet twines and methods of forming such twines from synthetic materials wherein the composite twine consists of a plurality of "A" strands each formed of a monofilament of synthetic material and at least one "B" strand formed of a plurality of twisted filaments with the "A" strands and the at least one twisted "B" strand being twisted together to form a composite multiple strand twisted synthetic twine wherein all "A" and "B" strands are exposed along the outer surface of the composite multiple strand twisted twine over a substantial portion of their lengths. For example, the present invention finds particularly advantageous use in the Alaskan fisheries where governmental regulations require that gillnets formed of synthetic twines have a minimum of at least thirty (30) strands or filaments; but, wherein such multiple strand twines have heretofore commonly been formed of a plurality of equal diameter filaments and, consequently, the resulting nets do not possess the desired characteristics of transparency or invisibility which is a requisite characteristic of such nets. The present invention readily meets the 30 strand or 30-plus strand requirement of the Alaskan fisheries while, at the same time, providing a 30 or 30-plus strand twisted twine having a small number of relatively thick monofilaments or "A" strands—say, for example, monofilaments on the order of about 1.5 mil (0.0015") in thickness—which are twisted together with at least one twisted multiple filament "B" strand comprising a plurality of relatively fine small diameter synthetic fibers—say, for example, filaments on the order of about 210 deniers—which are first twisted together to form the multiple filament "B" strand and where the thus twisted "B" strand is then twisted together with a plurality of monofilament "A" strands to form the composite 30 or 30-plus filament twine used to form the gillnet. The arrangement is such that the twine produced and, therefore, the nets employing such twines, are characterized by their transparency—i.e., invisibility in water—elasticity, durability, and the ease and efficiency with which knots can be formed, as well as enhanced knot stability.

2. Background Art

A wide variety of gillnets and gillnet forming procedures and equipment are presently known and used extensively throughout the world, in many of which the nets are formed of synthetic materials such, for example, as nylon, polypropylene, polyethylene, and the like, and/or combinations of such polymeric synthetic materials. While governmental regulations vary from fishery to fishery as to the nature and construction of those gillnets which are considered legal for use, in the Alaskan fisheries such governmental regulations require that the synthetic twines used in such nets comprise at least 30 strands or filaments. Many approaches have heretofore been employed by net manufacturers to meet this 30 to 30-plus strand requirement while attempting to optimize strength, transparency (or twine invisibility), durability and like characteristics. For example, in U.S. Pat. No. 3,329,061-Momoi, the patentee describes a twine construction, and fishnets produced therewith, wherein the twine comprises seven (7) strands or yarns—viz., a centercore formed of 210 denier nylon filaments having an "S" (i.e., clockwise) twist; and, six (6) outer strands or yarns formed of 210 denier nylon filaments having a "Z" (i.e., counterclockwise) twist wrapped thereabout. A commercial variation of this patented construction has long been available from Momoi Fish Net Manufacturing Co., Ltd. of Hyogo-ken, Japan, employing a twisted centercore formed of 210 denier synthetic filaments about which are wrapped six (6) synthetic strands or monofilaments to form a 7-strand twine wherein one strand comprises a multiple filament coaxial centercore and the remaining six (6) relatively large diameter strands each comprise a monofilament wrapped about the centercore. While such centercore constructions do serve to meet the 30 or 30-plus strand minimum requirement of the Alaskan fisheries, they have not served to optimize the strength and transparency characteristics so important to the fishing industry as a whole.

SUMMARY OF THE INVENTION

Multiple strand twisted twines suitable for fishnets, a method for forming the same, and fishnets produced therewith are disclosed which serve to optimize the strength, durability, transparency and repairability characteristics of fishnets and fishnet twines while, at the same time, meeting the minimum 30 strand or filament requirement established for the Alaskan fisheries; and, more specifically, twisted twines formed of synthetic fibers or filaments characterized by the presence of a first plurality—for example, from about 4 to about 14—of monofilaments (herein referred to as the "A" strands) each generally having a diameter of about 1.5 mil (about 0.0015") and a separate discrete twisted strand having a second plurality—for example, from about 26 to about 16—filaments formed of relatively fine diameter synthetic materials such, for example, as 210 denier nylon filaments. In the formation of the 30 or 30-plus strand twisted twine, the relatively fine 210 denier nylon filaments are first twisted together to form a twisted multiple filament strand (herein the "B" strand). Thereafter, one or more of the multiple filament "B" strands are twisted with the first plurality of relatively thick "A" strands to form a twisted composite 30 or 30-plus filament twine devoid of a centercore and wherein all of the "A" and "B" strands, including all of the fine 210 denier filaments defining the "B" strand(s), are exposed along the outer surface of the composite twisted twine along substantially the entire lengths of all synthetic filaments or monofilaments. In the exemplary forms of the invention described herein, the twisted multiple filament "B" strand is preferably twisted with either an "S" (clockwise) or a "Z" (counterclockwise) twist, with the thus formed "B" strand(s) thereafter being twisted along with a plurality of "A" strands in the opposite direction—i.e., with either a "Z" or an "S" twist. Because the twisted "B" strand is twisted along with the plurality of "A" strands, its effective length per unit length of the composite twisted twine is equal to the effective lengths of the monofilament "A" strands, thereby enhancing the strength and elasticity of the resultant composite twine and fishnets produced therewith. At the same time, the fact that the relatively fine denier filaments defining the "B"

strand(s) are exposed along the outer surface of the composite twisted "A" and "B" strands, serves to enhance the transparency characteristics of the composite twine, reduce knot slippage, facilitate manufacture and/or repair and, in general, significantly enhances the fish-catching ability of nets formed therewith.

It is a general aim of the present invention to provide a simple, easily manufactured, multiple filament twine characterized by its strength, durability, elasticity and transparency, yet which readily permits adherence to any specific governmental regulations pertaining to the number of filaments and/or strands required in the net twines employed.

More specifically, it is an object of the invention to provide a twisted multiple filament fishnet twine wherein each of the "A" (monofilament) and "B" (multiple filament) strands are of essentially the same length, thereby insuring that the strength and elasticity of the composite twine is enhanced and preventing load failure inherent with the relatively short coaxial centercores of twines employing a centercore construction.

As a result of attaining the foregoing objectives—particularly as a result of reducing the outer surface area of the composite twine defined by the relatively large diameter monofilaments while simultaneously increasing the surface area thereof defined by the relatively fine 210 denier filaments—the knots employed in the fishnets are considerably more stable, more efficient, and less prone to loosening and/or slippage. Moreover, fishnets employing such composite twines are considerably easier to mend or repair.

DESCRIPTION OF THE DRAWINGS

These and other objects and advantages of the present invention will become more readily apparent upon reading the following detailed description and upon reference to the attached drawing, in which.

Figure 1:
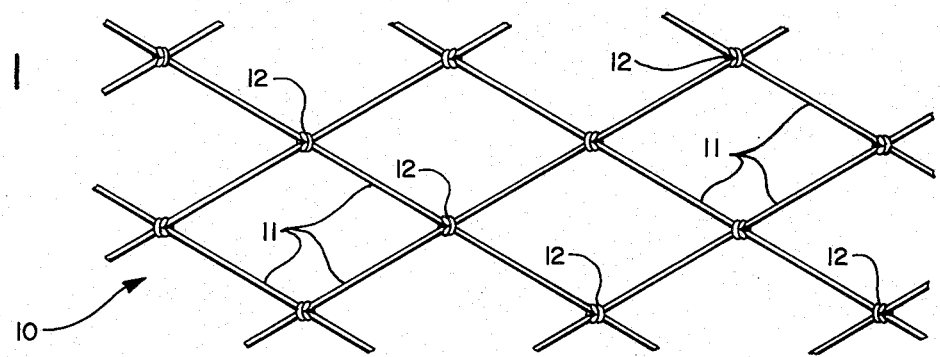
FIG. 1 is a fragmentary elevational view of a portion of a gillnet formed with composite twines embodying the features of the present invention.
Figure 2:
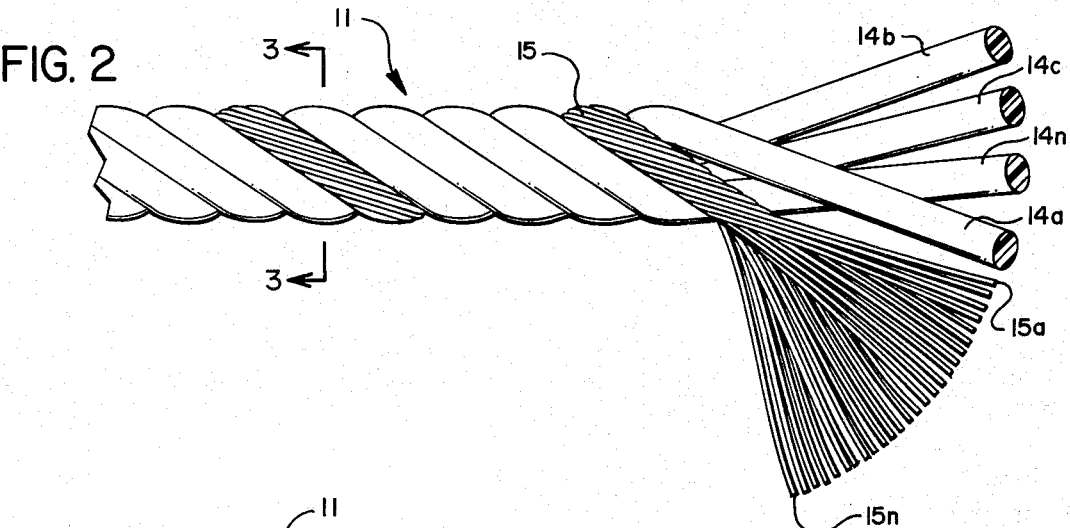
FIG. 2 is an enlarged fragmentary view of a portion of a twisted multiple strand synthetic fishnet twine made in accordance with one exemplary form of the invention.

While the invention is susceptible of various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents, and alternatives falling within the spirit and scope of the invention as expressed in the appended claims.

DETAILED DESCRIPTION

Turning now to the drawing, there has been illustrated in FIG. 1 a fragmentary portion of an open mesh gillnet or the like, generally indicated at 10. As here shown, the net 10 is formed from a plurality of lengths of synthetic twine 11 which are knotted together at intervals 12 to form the desired open mesh net 10. Such nets 10 may be formed in any well known conventional manner including by hand or, alternatively, with the use of conventional knotting machines (not shown). Moreover, the particular type(s) of knots employed—for example, a single weaver's knot, a bowline, etc.—are not important to the present invention; and, any suitable conventional knot tying technique and/or equipment may be employed.

In accordance with one of the important aspects of the present invention, provision is made for forming a twisted multiple strand fishnet twine 11 from filaments of synthetic material where the twine is comprised of a plurality of strands formed of at least two dissimilar diameter filaments—viz., a first plurality of "A" strands $14_a$-$14_n$ each comprising a monofilament formed of synthetic material and which is, for example, approximately 1.5 mils (0.0015″) in diameter; and, at least one "B" strand 15 comprising a plurality of relatively fine twisted filaments $15_a$-$15_n$ of synthetic material which are, for example, on the order of 210 denier filaments. In the exemplary forms of the invention shown in the drawing, there are four (4) relatively thick monofilament strands $14_a$-$14_n$, while the multiple filament strand 15 is comprised of twenty-six (26) filaments twisted together to form a twisted strand 15 which is the same overall length as are the monofilaments strands $14_a$-$14_n$; but, which does not necessarily bear any relation to strands $14_a$-$14_n$ in terms of diameter—that is, twisted strand 15 may have the same diameter as each of strands $14_a$-$14_n$, or it may be greater or less in diameter dependent upon the number of filaments $15_a$-$15_n$ employed, their denier, and the particular diameter(s) selected for the monofilaments $14_a$-$14_n$. Moreover, the particular synthetic material employed may vary widely. For example, while excellent results have been achieved utilizing nylon, other polymeric materials may be used such as polypropylene, polyethylene, etc. and/or mixtures or blends of such polymeric materials. Other representative suitable materials include: (i) polyamide synthetic fibers such as hexamethylenediamine, adipamide, polyactoamides, etc.; and (ii), polyvinyl synthetic fibers such as polyvinyl chloride, after chlorinated materials of polyvinyl chloride, copolymers of vinyl chloride and vinyl acetate, polyvinyl alcohol, polyvinylidene chloride, polyacrylonitrile, copolymers of vinylidene chloride and vinyl chloride, copolymers of acrylonitrile, polyacrylonitrile, etc.

Figure 3:
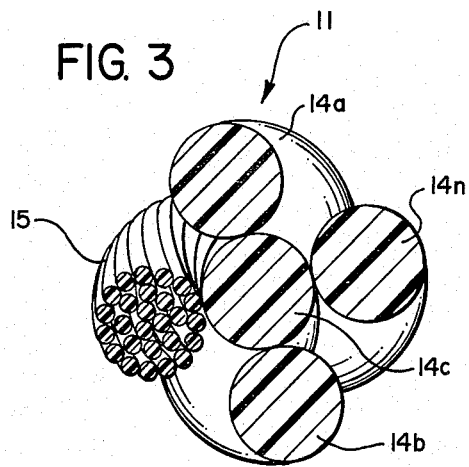
FIG. 3 is a sectional view taken substantially along the line 3—3 in FIG. 2, here illustrating an exemplary twine embodying features of the invention as incorporated in a 5-strand twisted twine having four (4) monofilament "A" strands twisted with a single multiple filament "B" strand (here having at least 26 relatively fine denier filaments) with a "Z" or counterclockwise twist while the multiple filament "B" strand is formed with an "S" or clockwise twist; and, FIG. 4 is a sectional view similar to that shown in FIG. 3, but here illustrating the composite twine as having an outer "S" twist and wherein the multiple filament "B" strand is first formed with a "Z" twist.
Figure 4:
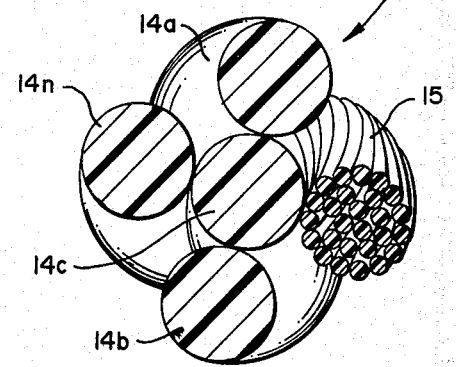

In carrying out the present invention, the filaments $15_a$-$15_n$ comprising the multi-filament strand 15 are first twisted together in a conventional manner to form a twisted "B" strand 15 having either an "S" (clockwise) twist as shown in FIG. 3 or a "Z" (counterclockwise) twist as shown in FIG. 4. Thereafter, the twisted multiple filament "B" strand 15 is twisted together with the plurality of monofilament "A" strands $14_a$-$14_n$, preferably with a twist of opposite direction to that employed with the "B" strand 15—i.e., in FIG. 3, the overall twine 11 has its "A" and "B" strands $14_a$-$14_n$ and 15 twisted together with a "Z" (counterclockwise) twist, while the 210 denier filaments $15_a$-$15_n$ defining the multiple filament "B" strand 15 are twisted with a clockwise or "S" twist. Conversely, in FIG. 4, the filaments $15_a$-$15_n$ defining the "B" strand 15 are first twisted in a counterclockwise direction or with a "Z" twist; and, thereafter, the "A" and "B" strands $14_a$-$14_n$ and 15 are twisted together with an "S" counterclockwise twist to form the composite twine 11'. The resulting twines—viz., twine 11 in FIG. 3 and twine 11' in FIG. 4—are characterized by the absence of a centercore and by individual strands "A" and "B" which are of equal length per unit length of the twines. Consequently, loads are distributed more evenly throughout the monofilament strands $14_a$-$14_n$ and the twisted multiple filament strand 15; and, the twisted nature of all "A" and "B" strands permits of sufficient elasticity that there is no tendency for one strand to prematurely fail as is the case in a centercore construction wherein the entire load is initially applied to the relatively short straight centercore strand. Thus, in actual strength tests of equal diameter twines formed of nylon, it has been found that the breaking strength of a coreless twine made in accordance with the invention was on the order of 58 pounds, while a conventional centercore construction exhibited a breaking strength of only 44 pounds—i.e., an improvement in strength of approximately 31.8%.

Moreover, it has been found that twines made in accordance with the present invention and, therefore, nets formed therefrom, exhibit optimized characteristics of transparency—i.e., invisibility in water—when compared with conventional synthetic twines or twines employing a centercore construction. Thus, when compared with a twine employing, for example, 30 equal diameter monofilaments which may range in thickness from approximately 0.25 mils to about 0.5 mils, it has been found that the use of a small number of monofilaments on the order of 1.5 mils in thickness—e.g., from about 4 to about 14 monofilaments—together with a plurality of fine filaments—e.g., 210 denier filaments—ranging from about 16 to about 24 or more, in number, render the composite twine considerably more transparent. The same effect has been observed when compared with a conventional centercore construction where the twisted fine 210 denier centercore filaments are embedded coaxially within the outer relatively thick monofilaments which tend to minimize the transparency characteristics attributable to the 210 denier filaments; whereas, in twines made in accordance with the invention, the twisted multiple filament 210 denier fibers are exposed along the outer surface of the twine, thereby contributing to the transparency characteristics of the twine.

A further advantage of the present invention resides in the fact that synthetic twisted twines characterized by only relatively large diameter monofilaments on the outer periphery of the twine are considerably more slippery than is a twine made in accordance with the invention which is characterized by a mixture of large diameter monofilaments and a multi-filament twisted strand composed of 210 denier fibers or the like. As a consequence, there is less tendency for knots such as those indicated at 12 in FIG. 1 to loosen and/or slip. For the same reason, twines made in accordance with the invention may be more securely joined to synthetic twines in an existing net, thereby facilitating repair work and enhancing the strength of the repaired net.

Yet another advantage of the present invention resides in the fact that twines made in accordance with the invention are considerably more elastic, resilient and flexible then are conventional centercore constructions due to the fact that the high strength twisted multiple filament "B" strand 15 is twisted together with the monofilament "A" strands $14_a$-$14_n$ rather than being embedded in the twine as a coaxial straight centercore. This not only enhances the ease of repairability; but, in addition, nets are easier to "pick". That is, fish caught by their gills in the net may be more easily removed from the net due to its elasticity, resilience and flexibility with less danger of damaging the net.

While the illustrative forms of the invention shown in the drawing and described hereinabove contemplate imparting an opposite twist to the "A" and "B" strands $14_a$-$14_n$ and 15 as compared to that imparted to the filaments $15_a$-$15_n$ comprising the "B" strand 15, those skilled in the are will appreciate that opposite twists are not absolutely essential. Thus, it has been found that where both twists are in the same direction—for example, an "S" twist—the second twisting operation for the "A" and "B" strands $14_a$-$14_n$ and 15 tends to partially untwist the previously twisted "B" strand 15. Consequently, where both twists are to be of the same type—either "S" or "Z"—it is preferable to overtwist the multiple filament strand 15 somewhat during the first twisting operation so as to compensate for the degree of untwisting that occurs during the second twisting operation. It is for this reason that it is preferable to twist the filaments $15_a$-$15_n$ comprising the "B" strand 15 in a direction opposite to the twist imparted to the "A" and "B" strands $14_a$-$14_n$ and 15. Whether the final twist is an "S" twist or a "Z" twist is, in essence, unimportant to the invention except insofar as compatability with the particular market is concerned. That is, when the twine is to be used for repairing existing nets or to form net sections which are to be joined to existing net sections, it is desirable that the final twist imparted be the same as that employed on the existing product; and, in today's world market, the most conventional configuration is one wherein the final twist is a "Z" or counterclockwise twist.

While the invention has been described above in connection with a twisted twine 11 (FIG. 3) or 11' (FIG. 4) comprising four (4) monofilaments $14_a$-$14_n$ (i.e., "n" equals 4) and twenty-six (26) 210 denier filaments $15_a$-$15_n$ (i.e., "n" equals 26) in the "B" strand 15, in its broader aspects, the invention is not limited to that particular combination. For example, where the twine 11 or 11' is to be employed in the Alaskan fisheries, regulations require that it include at least 30 filaments or strands. Such an arrangement can be accomplished in numerous combinations such, for example, as in the following Examples I and II.

EXAMPLE I

| Number of Monofilament "A" Strands $14_a$-$14_n$ | | Number of Filaments $15_a$-$15_n$ in "B" Strand 15 | | Total Filaments or Strands in Twine 11 (11') |
|---|---|---|---|---|
| 4 | + | 26 | = | 30 |
| 6 | + | 24 | = | 30 |
| 8 | + | 24 | = | 32 |
| 10 | + | 24 | = | 34 |
| 12 | + | 24 | = | 36 |
| 14 | + | 24 | = | 38 |

EXAMPLE II

| Number of Monofilament "A" Strands $14_a$-$14_n$ | | Number of Filaments $15_a$-$15_n$ in "B" Strand 15 | | Total Filaments or Strands in Twine 11 (11') |
|---|---|---|---|---|
| 4 | + | 26 | = | 30 |
| 6 | + | 24 | = | 30 |
| 8 | + | 22 | = | 30 |
| 10 | + | 20 | = | 30 |
| 12 | + | 18 | = | 30 |
| 14 | + | 16 | = | 30 |

Thus, in Example I it will be noted that several of the combinations contain more than thirty (30) total filaments or strands, while in Example II, all of the combinations set forth contemplate a total of thirty (30) filaments or strands. Obviously, however, other specific combinations can be employed without departing from the spirit and scope of the invention as described herein and as expressed in the appended claims. Moreover, when employed in other than the Alaskan fisheries, the invention readily permits of various combinations of relatively thick monofilaments $14_a$-$14_n$ and a twisted strand 15 of small denier fibers $15_a$-$15_n$ which, in total, constitute fewer than thirty (30) filaments or strands. Finally, it is within the scope of the invention to employ more than one "B" strand 15 in any given twine. For example, the twines 11 and 11' shown in FIGS. 3 and 4 each comprise four (4) monofilament "A" strands $14_a$-$14_n$ and one multiple filament "B" strand 15 having twenty-six (26) filaments $15_a$-$15_n$. However, it would be within the scope of the invention to employ two thirteen (13) filament "B" strands 15, or, for that matter, two "B" strands 15 having a different number of filaments per strand which, in total, constitute twenty-six (26) filaments. And, of course, it is also possible to employ more than two multi-filament "B" strands 15 in any given twine.

While the synthetic monofilaments $14_a$-$14_n$ and the relatively fine filaments $15_a$-$15_n$ have herein been described as having thicknesses on the order of about 1.5 mils (monofilaments $14_a$-$14_n$) and about 210 denier (filaments $15_a$-$15_n$), those skilled in the art will appreciate that other dimensional relationships may be employed without departing from the spirit and scope of the invention as expressed in the appended claims. For example, while excellent results have been achieved using monofilaments $14_a$-$14_n$ on the order of 1.5 mils in thickness, such monofilaments can range from about 1 mil to about 3 mils in thickness. Similarly, filaments $15_a$-$15_n$ can be employed other than 210 denier such, merely by way of example, as about 55 denier, 110 denier, etc.

What is claimed is:

1. The method of forming a coreless multiple strand fishnet twine consisting of a plurality of filaments of synthetic material comprising the steps of:
   (a) twisting a plurality of relatively fine denier filaments formed of synthetic material together to form a first twisted "B" strand; and,
   (b) twisting the multiple filament "B" strand together with a plurality of "A" strands, each comprising a monofilament formed of synthetic material and having a diameter substantially greater than the diameters of the fine denier multiple filaments incorporated in the "B" strand to form a coreless multiple strand fishnet twine comprising a mixture of a plurality of monofilament "A" strands and at least one multiple filament "B" strand wherein all of the "A" and "B" strands are of equal length and are exposed on the outer surface of the multiple strand fishnet twine over a substantial portion of their lengths.

2. The method of forming a coreless multiple strand fishnet twine as set forth in claim 1 wherein the relatively fine denier filaments are twisted together in one of an "S" or a "Z" configuration to form the twisted "B" strand in step (a), and the thus twisted "B" strand is thereafter twisted together with a plurality of monofilament "A" strands in the other of an "S" or a "Z" configuration during step (b).

3. The method of forming a coreless multiple strand fishnet twine as set forth in claims 1 or 2 wherein the synthetic material is a polymeric material.

4. The method of forming a coreless multiple strand fishnet twine as set forth in claims 1 or 2 wherein the fine denier filaments and the monofilaments are selected from the group of polymeric materials including nylon, polypropylene, polyethylene and blends or mixtures thereof.

5. The method of forming a coreless multiple strand fishnet twine as set forth in claims 1 or 2 wherein the monofilament "A" strands have a thickness on the order of about 1.5 mils.

6. The method of forming a coreless multiple strand fishnet twine as set forth in claims 1 or 2 wherein the fine denier filaments defining the "B" strands(s) are on the order of about 210 denier.

7. The method of forming a coreless multiple strand fishnet twine as set forth in claims 1 or 2 wherein the monofilament "A" strands having a thickness on the order of about 1.5 mils and the fine denier filaments defining the "B" strand(s) are on the order of about 210 denier.

8. The method of forming a coreless multiple strand fishnet twine as set forth in claims 1 or 2 wherein the total number of monofilaments and fine denier filaments in the "A" and "B" strands respectively is at least 30.

9. The method of forming a coreless multiple strand fishnet twine as set forth in claims 1 or 2 wherein the number of monofilament "A" strands and the number of fine denier filaments in the "B" strand(s) are selected from the following groups:

| A | + | B | = | TOTAL FILAMENTS |
|---|---|---|---|---|
| 4 | + | 26 | = | 30; |
| 6 | + | 24 | = | 30; |
| 8 | + | 22 | = | 30; |
| 10 | + | 20 | = | 30; |
| 12 | + | 18 | = | 30; |
| 14 | + | 16 | = | 30; |
| 8 | + | 24 | = | 32; |
| 10 | + | 24 | = | 34; |
| 12 | + | 24 | = | 36; and, |
| 14 | + | 24 | = | 38. |

10. A coreless multiple strand fishnet twine formed of filaments of synthetic materials comprising, in combination:
   (a) a plurality of "A" strands each comprising a monofilament formed of synthetic material;
   (b) at least one "B" strand comprising a plurality of twisted filaments formed of synthetic materials each substantially smaller in diameter than the diameter of said "A" strand monofilaments; and, (c) said monofilament "A" strands and said multiple filament twisted "B" strand(s) being twisted together to form a multiple strand fishnet twine comprising a mixture of monofilament "A" strands and at least one multiple filament "B" strand wherein all "A" and "B" strands are exposed on the outer surface of said multiple strand fishnet twine over a substantial portion of their lengths.

11. A coreless multiple strand fishnet twine as set forth in claim 10 wherein said plurality of twisted filaments in said "B" strand(s) are twisted together in one of an "S" or a "Z" configuration to form said twisted "B" strand(s), and said twisted "B" strand(s) is (are) twisted together with said plurality of "A" strands in the other of said "S" or "Z" configurations.

12. A coreless multiple strand fishnet twine as set forth in claims 10 or 11 wherein said synthetic material is a polymeric material.

13. A coreless multiple strand fishnet twine as set forth in claims 10 or 11 wherein said twisted filaments in said "B" strand(s) and said monofilament "A" strands are selected from the group of polymeric materials including nylon, polypropylene, polyethylene and blends or mixtures thereof.

14. A coreless multiple strand fishnet twine as set forth in claims 10 or 11 where said monofilament "A" strands have a thickness on the order of about 1.5 mils.

15. A coreless multiple strand fishnet twine as set forth in claims 10 or 11 wherein said twisted filaments in said "B" strand(s) are on the order of about 210 denier.

16. A coreless multiple strand fishnet twine as set forth in claims 10 or 11 wherein said monofilament "A" strands have a thickness on the order of about 1.5 mils and said twisted filaments in said "B" strand(s) are on the order of about 210 denier.

17. A coreless multiple strand fishnet twine as set forth in claims 10 or 11 wherein the total number of said monofilaments and said twisted filaments in said "A" and "B" strands respectively is at least 30.

18. A coreless multiple strand fishnet twine as set forth in claims 10 or 11 wherein the number of said monofilaments and said twisted filaments in said "A" and "B" strands respectively are selected from the following groups:

| A | + | B | = | TOTAL FILAMENTS |
|---|---|---|---|---|
| 4 | + | 26 | = | 30; |
| 6 | + | 24 | = | 30; |
| 8 | + | 22 | = | 30; |
| 10 | + | 20 | = | 30; |
| 12 | + | 18 | = | 30; |
| 14 | + | 16 | = | 30; |
| 8 | + | 24 | = | 32; |
| 10 | + | 24 | = | 34; |
| 12 | + | 24 | = | 36; and, |
| 14 | + | 24 | = | 38. |

19. A fish net formed from a plurality of twisted multiple strand fishnet twines knotted together to form an open mesh and wherein each of said twisted multiple strand fishnet twines comprises, in combination:

(a) a plurality of "A" strands each comprising a monofilament formed of synthetic material;

(b) at least one "B" strand comprising a plurality of twisted filaments formed of synthetic materials each substantially smaller in diameter than the diameter of said "A" strand monofilaments; and, (c) said monofilament "A" strands and said multiple filament "B" strand(s) being twisted together to form a multiple strand twine comprising a mixture of monofilament "A" strands and at least one multiple filament "B" strand wherein all "A" and "B" strands are exposed on the outer surface of said multiple strand twine over a substantial portion of their lengths.

20. A fishnet as set forth in claim 19 wherein said plurality of twisted filaments in said "B" strand(s) are twisted together in one of an "S" or a "Z" configuration to form said twisted "B" strand(s), and said twisted "B" strand(s) is (are) twisted together with said plurality of "A" strands in the other of said "S" or "Z" configurations.

21. A fishnet as set forth in claims 19 or 20 wherein said synthetic material is a polymeric material.

22. A fishnet as set forth in claims 19 or 20 wherein said twisted filaments in said "B" strand(s) and said monofilament "A" strands are selected from the group of polymeric materials including nylon, polypropylene, polyethylene and blends or mixtures thereof.

23. A fishnet as set forth in claims 19 or 20 where said monofilament "A" strands have a thickness on the order of about 1.5 mils.

24. A fishnet as set forth in claims 19 or 20 wherein said twisted filaments in said "B" strand(s) are on the order of about 210 denier.

25. A fishnet as set forth in claims 19 or 20 wherein said monofilament "A" strands have a thickness on the order of about 1.5 mils and said twisted filaments in said "B" strand(s) are on the order of about 210 denier.

26. A fishnet as set forth in claims 19 or 20 wherein the total number of said monofilaments and said twisted filaments in said "A" and "B" strands respectively is at least 30.

27. A fishnet as set forth in claims 19 or 20 wherein the number of said monofilaments and said twisted filaments in said "A" and "B" strands respectively are selected from the following groups:

| A | + | B | = | TOTAL FILAMENTS |
|---|---|---|---|---|
| 4 | + | 26 | = | 30; |
| 6 | + | 24 | = | 30; |
| 8 | + | 22 | = | 30; |
| 10 | + | 20 | = | 30; |
| 12 | + | 18 | = | 30; |
| 14 | + | 16 | = | 30; |
| 8 | + | 24 | = | 32; |
| 10 | + | 24 | = | 34; |
| 12 | + | 24 | = | 36; and, |
| 14 | + | 24 | = | 38. |

* * * * *